United States Patent
Omura

(10) Patent No.: US 9,436,318 B2
(45) Date of Patent: Sep. 6, 2016

(54) COORDINATE DETECTING APPARATUS, METHOD OF DETECTING COORDINATE, AND ELECTRONIC INFORMATION BOARD SYSTEM

(71) Applicant: Katsuyuki Omura, Tokyo (JP)

(72) Inventor: Katsuyuki Omura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 14/452,604

(22) Filed: Aug. 6, 2014

(65) Prior Publication Data
US 2015/0054791 A1    Feb. 26, 2015

(30) Foreign Application Priority Data
Aug. 21, 2013  (JP) .................................. 2013-171159

(51) Int. Cl.
| | |
|---|---|
| G06F 3/042 | (2006.01) |
| G06F 3/041 | (2006.01) |
| G06F 3/0354 | (2013.01) |
| G01B 11/00 | (2006.01) |

(52) U.S. Cl.
CPC ............. *G06F 3/0421* (2013.01); *G01B 11/00* (2013.01); *G06F 3/03542* (2013.01); *G06F 3/0418* (2013.01)

(58) Field of Classification Search
CPC .. G06F 3/0488; G06F 3/04883; G06F 3/044; G06F 3/04886; G06F 3/045; G06F 3/0418; G06F 3/042; G06F 3/03542
See application file for complete search history.

(56) References Cited

U.S. PATENT DOCUMENTS

| | | |
|---|---|---|
| 4,713,534 A | 12/1987 | Masters et al. |
| 6,421,042 B1 | 7/2002 | Omura et al. |
| 6,429,856 B1 | 8/2002 | Omura et al. |
| 6,518,960 B2 | 2/2003 | Omura et al. |
| 6,563,491 B1 | 5/2003 | Omura |
| 6,594,023 B1 | 7/2003 | Omura et al. |
| 6,608,619 B2 | 8/2003 | Omura et al. |
| 6,760,009 B2 | 7/2004 | Omura et al. |
| 6,762,747 B2 | 7/2004 | Fujioka et al. |

(Continued)

FOREIGN PATENT DOCUMENTS

| | | |
|---|---|---|
| EP | 1100041 | 5/2001 |
| JP | 2678231 | 11/1997 |

(Continued)

OTHER PUBLICATIONS

U.S. Appl. No. 14/189,115, filed Feb. 25, 2014.

(Continued)

*Primary Examiner* — Md Saiful A Siddiqui
(74) *Attorney, Agent, or Firm* — IPUSA, PLLC

(57) ABSTRACT

A coordinate detecting apparatus includes a light emitting element that is provided in a peripheral portion surrounding a surface of a display and emits a light in a direction parallel to the surface of the display; a light receiving element that is provided in the peripheral portion surrounding the surface of the display and receives the light emitted from the light emitting element; and a polarization unit that limits an oscillation direction of the light received by a light receiving surface of the light receiving element to a predetermined direction where only a real image is formed on the light receiving surface, wherein a coordinate of a touch position where an indicating unit touches the surface of the display is detected based on a light intensity distribution of the light received by the light receiving element.

8 Claims, 10 Drawing Sheets

(56) References Cited

U.S. PATENT DOCUMENTS

| | | |
|---|---|---|
| 6,791,700 B2 | 9/2004 | Omura et al. |
| 7,184,592 B2 | 2/2007 | Iga et al. |
| 7,312,787 B2 | 12/2007 | Fujioka et al. |
| 2004/0061689 A1* | 4/2004 | Ito .................................. 345/175 |
| 2005/0041013 A1 | 2/2005 | Tanaka |
| 2007/0067370 A1 | 3/2007 | Honda et al. |
| 2012/0032976 A1 | 2/2012 | Nagahara et al. |
| 2012/0062591 A1 | 3/2012 | Omura et al. |
| 2012/0206387 A1 | 8/2012 | Omura et al. |
| 2012/0235934 A1 | 9/2012 | Kawasaki et al. |
| 2013/0135263 A1 | 5/2013 | Omura |
| 2013/0135346 A1 | 5/2013 | Sakuramata et al. |
| 2013/0201225 A1* | 8/2013 | Choi et al. .................... 345/690 |
| 2013/0257816 A1 | 10/2013 | Omura |
| 2014/0192058 A1 | 7/2014 | Kodama et al. |

FOREIGN PATENT DOCUMENTS

| | | |
|---|---|---|
| JP | 2001-056738 | 2/2001 |
| JP | 4627781 | 2/2011 |
| WO | 2013/111447 | 8/2013 |

OTHER PUBLICATIONS

Extended European Search Report dated Feb. 18, 2015.

\* cited by examiner

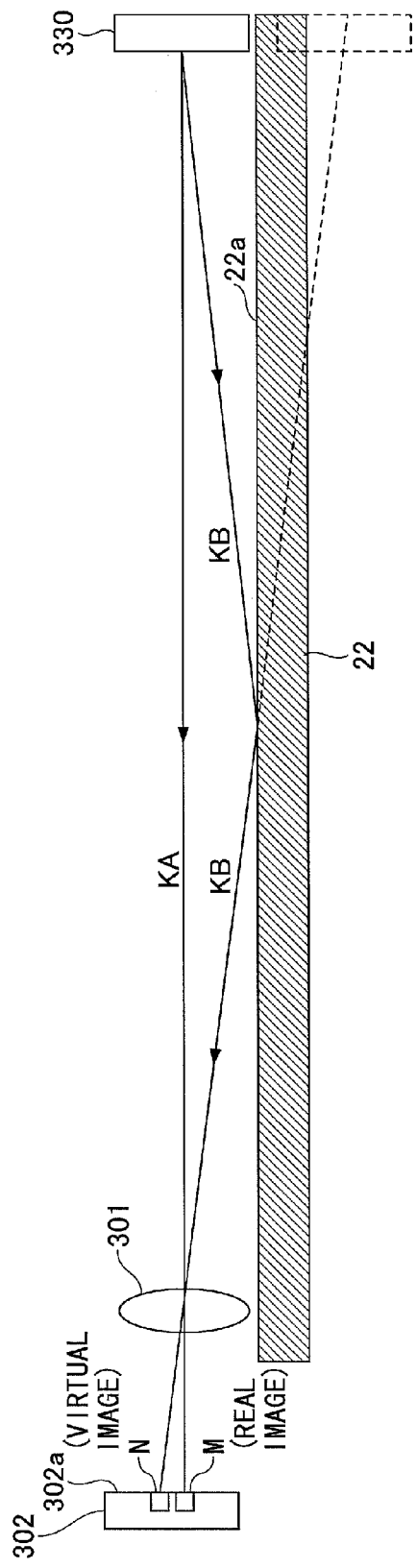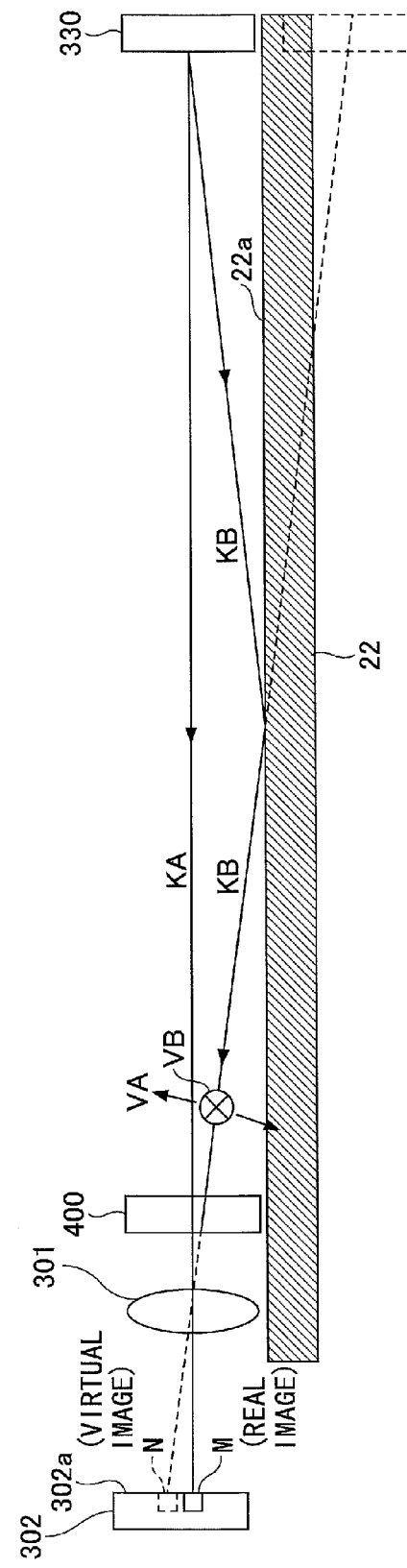

COORDINATE DETECTING APPARATUS, METHOD OF DETECTING COORDINATE, AND ELECTRONIC INFORMATION BOARD SYSTEM

BACKGROUND OF THE INVENTION

1. Field of the Invention

The present invention generally relates to a coordinate detecting apparatus, a method of detecting coordinate, and an electronic information board system 2. Description of the Related Art In recent years, an electronic information board called an electronic copyboard or an interactive whiteboard (IWB) is being developed.

For example, this type of the electronic information board system is structured by combining a touch panel display using a flat panel such as a liquid crystal panel or a plasma panel and a coordinate detecting apparatus for detecting a coordinate where a touch occurs on a display element face of the touch panel display.

A coordinate detecting apparatus used for an electronic information board system includes, for example, a pair of light emission sensors for optically detecting a touch position are provided on upper corners of the touch panel display. A retroreflection plate for reflecting a light from the light emission sensor is provided in a peripheral portion of the touch panel display.

For example, when an end of the indicating unit such as a dedicated stylus pen, a finger, a pointing stock or the like touches a surface of a protection glass of a touch panel display, a light from a light emission sensor is interrupted at the touch position. A light passing through a position other than the touch position reflects on the retroreflection plate and is received by the light emission sensor. Thus, a coordinate of the touch position of the indicating unit where a reflected light is interrupted is detected in the coordinate detecting apparatus.

Further, in the coordinate detecting apparatus of the electronic information board system, based on a detection signal from the light emission sensor, an angle of a light interrupted at the touch position of the stylus pen (the indicating unit) is obtained and the coordinate of the touch position is calculated using the principal of triangular survey as disclosed in Japanese Patent No. 4627781.

Further, according to another method of detecting the coordinate disclosed in Japanese Patent No. 2678231, multiple light-emitting diodes and multiple light receiving elements are arranged in a peripheral portion of the touch panel display so as to face one another in an X direction or a Y direction of the touch panel display. In this method of detecting the coordinate, the coordinate can be detected using a lowered output level of a detection signal obtained by the light receiving element when a light emitted from a light emitting element is interrupted by a stylus pen or a finger at a touch position.

However, Japanese Patent No. 4627781 calculates the position of the stylus pen or the finger based on the lowered receiving light intensity of the detected light corresponding to a shaded position caused by interruption of the light by the stylus pen or the finger. In this method of detecting the coordinate, a detection light emitted by the light emission sensor travels in parallel with the surface of the protection glass of the touch panel display and is reflected by a retroreflection plate so as to be returned through a path similar to a travelling path. The reflected light is received by the light emission sensor.

As disclosed in Japanese Patent No. 2678231, in a case where multiple light emitting elements and multiple light receiving elements are arranged in the peripheral portion of the touch panel display so as to face one another and lights emitted from the light emitting elements are received by the light receiving elements, the coordinate is calculated based on the position of one light receiving element which cannot receive the light from the light emitting elements.

In Japanese Patent No. 4627781 and Japanese Patent No. 2678231, because the light is incident on a light receiving unit of a light emission sensor or a light receiving element irradiates substantially in parallel with the surface of the protection glass of the touch panel display, a component of the reflected light caused by a total reflection on the surface of an element of the touch panel display or the surface of the protection glass is incident on the light receiving unit of the light emission sensor or the light receiving element in addition to the light reaching the light emission sensor or the light receiving element.

As such, while the reflected light from the touch panel display or the surface of the protection glass is received and the stylus pen or the finger touches the surface of the protection glass, the protection glass slightly shows flexural deformation by a pressure caused by the touch. With this, a reflection angle of the totally reflected light reflected on the surface of the protection glass changes to thereby vary the light intensity of the light reaching the light receiving element.

If the light intensity varies as such, an error occurs in detecting a coordinate position because a position where the light intensity is lowered or the lowered light intensity is detected as if the dedicated stylus pen or the finger interrupts the light. Consequently, there occurs a problem that the coordinate of the touch position cannot be accurately detected.

SUMMARY OF THE INVENTION

It is an object of at least one embodiment of the present invention to provide a coordinate detecting apparatus, a method of detecting coordinate, and an electronic information board system that substantially obviate one or more problems caused by the limitations and disadvantages of the related art.

One aspect of the embodiments of the present invention may be to provide a coordinate detecting apparatus including a light emitting element that is provided in a peripheral portion surrounding a surface of a display and emits a light in a direction parallel to the surface of the display; a light receiving element that is provided in the peripheral portion surrounding the surface of the display and receives the light emitted from the light emitting element; and a polarization unit that limits an oscillation direction of the light received by a light receiving surface of the light receiving element to a predetermined direction where only a real image is formed on the light receiving surface, wherein a coordinate of a touch position where an indicating unit touches the surface of the display is detected based on a light intensity distribution of the light received by the light receiving element.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 10 schematically illustrates a structure including a light receiving element, a light receiving lens, a retroreflection plate, and a display surface;

FIG. 11 schematically illustrates a structure where a light polarizer is arranged in front of the light receiving lens;

Other objects and further features of embodiments will be apparent from the following detailed description when read in conjunction with the accompanying drawings.

DETAILED DESCRIPTION OF THE PREFERRED EMBODIMENTS

A description is given below, with reference to the FIG. 1 through FIG. 13 of embodiments of the present invention. Where the same reference symbols are attached to the same parts, repeated description of the parts is omitted.

Reference symbols typically designate as follows:
10: electronic information board system;
20: display unit;
22: protection glass;
24: coordinate detecting apparatus;
30: keyboard;
40: stand;
50: device accommodating part;
60: controller;
90: user PC;
100: stylus pen;
120: penpoint movable portion;
130: pen tail movable portion;
200: communication line;
210: pen signal receiving part;
220: controller operation system part;
230: application part;
231: event signal determining part;
232: image input process part;
234: screen drawing process part;
236: screen erasure process part;
238: screen operation process part;
240: image input device part;
250: touch panel driver part;
300, 310: light emission sensor;
301: condensing lens;
302: light receiving element;
320, 330, 340: retroreflection plate;
350: light emission sensor circuit;
380: secondary light source;
382: slit;
383: light source;
384, 385, 386: cylindrical lens;
387: half mirror;
390: touch panel area;
400: light polarizer;
KA: real image light path;
KB: virtual image light path;
JA, JB: position;
L1-Ln: probe light;
LA,LB,LC,LD: light traveling direction;
M: real image;
N: virtual image.

(Structure of Electronic Information Board System)

Figure 1:
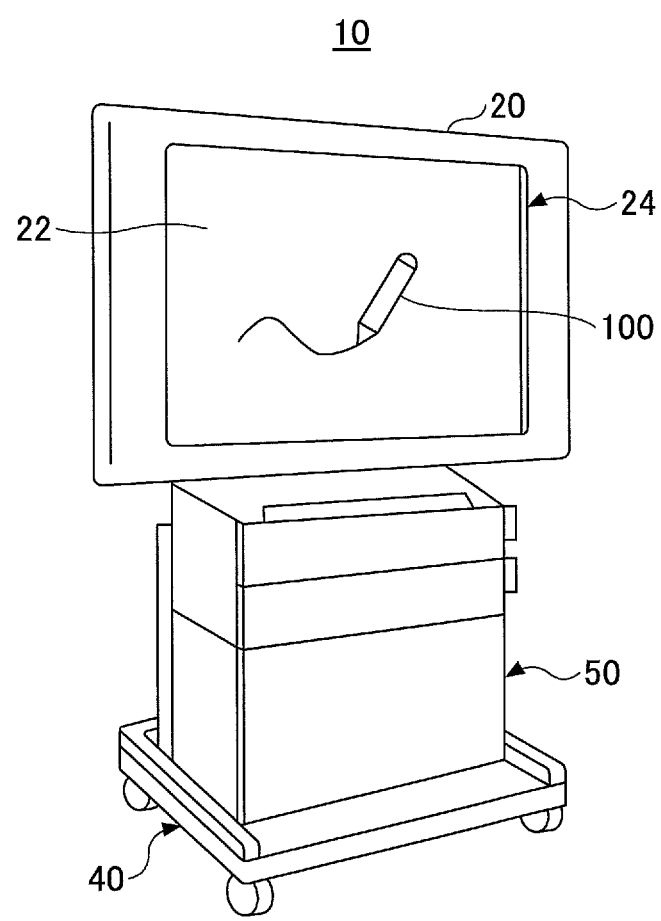
FIG. 1 is a perspective view illustrating an electronic information board system to which a coordinate detecting apparatus of an embodiment of the present invention is applied.

FIG. 1 is a perspective view illustrating an electronic information board system to which a coordinate detecting apparatus of a first embodiment of the present invention is applied. Referring to FIG. 1, the electronic information board system 10 includes a display unit 20, a stand 40, and a device accommodating portion 50. The display unit 20 includes a flat panel such as a liquid crystal panel or a plasma panel. A protection glass 22 is attached to a forward side of a display element face of the display unit. The protection glass 22 forms the surface of the display unit 20 and is provided with a coordinate detecting apparatus 24 of an optical touch panel type, which detects a coordinate position where a touch occurs.

Further, in the electronic information board system 10, an end of a dedicated stylus pen (an indicating unit) 100 touches the protection glass 22 to write a character, a graphic, or the like. Instead of the stylus pen 100, a pointing stick or a finger or a hand of an operator can be used as an indicating unit.

The stylus pen 100 sends a transcription detection signal as a wireless signal when a penpoint (one tip end) of the stylus pen 100 touches the surface (the display surface) of the protection glass 22. The display unit 20 displays the character, the graphic, or the like, which is written at a coordinate position detected by the coordinate detecting apparatus 24, when the transcription detecting signal sent from the stylus pen 100 is received.

When a pen tail (another tip end) of the stylus pen 100 touches the surface (the display surface) of the protection glass 22, the stylus pen 100 sends a detection signal for erasure as a wireless signal. The display unit 20 erases the character, the graphic, or the like, which is written at a coordinate position detected by the coordinate detecting apparatus 24, when the erasure detection signal sent from the stylus pen 100 is received.

The device accommodating part 50 accommodates various devices such as a controller, a printer, or a video disk device. Further, a keyboard 30 for performing an input operation is mounted on the upper surface of the device accommodating part 50.

Figure 2:
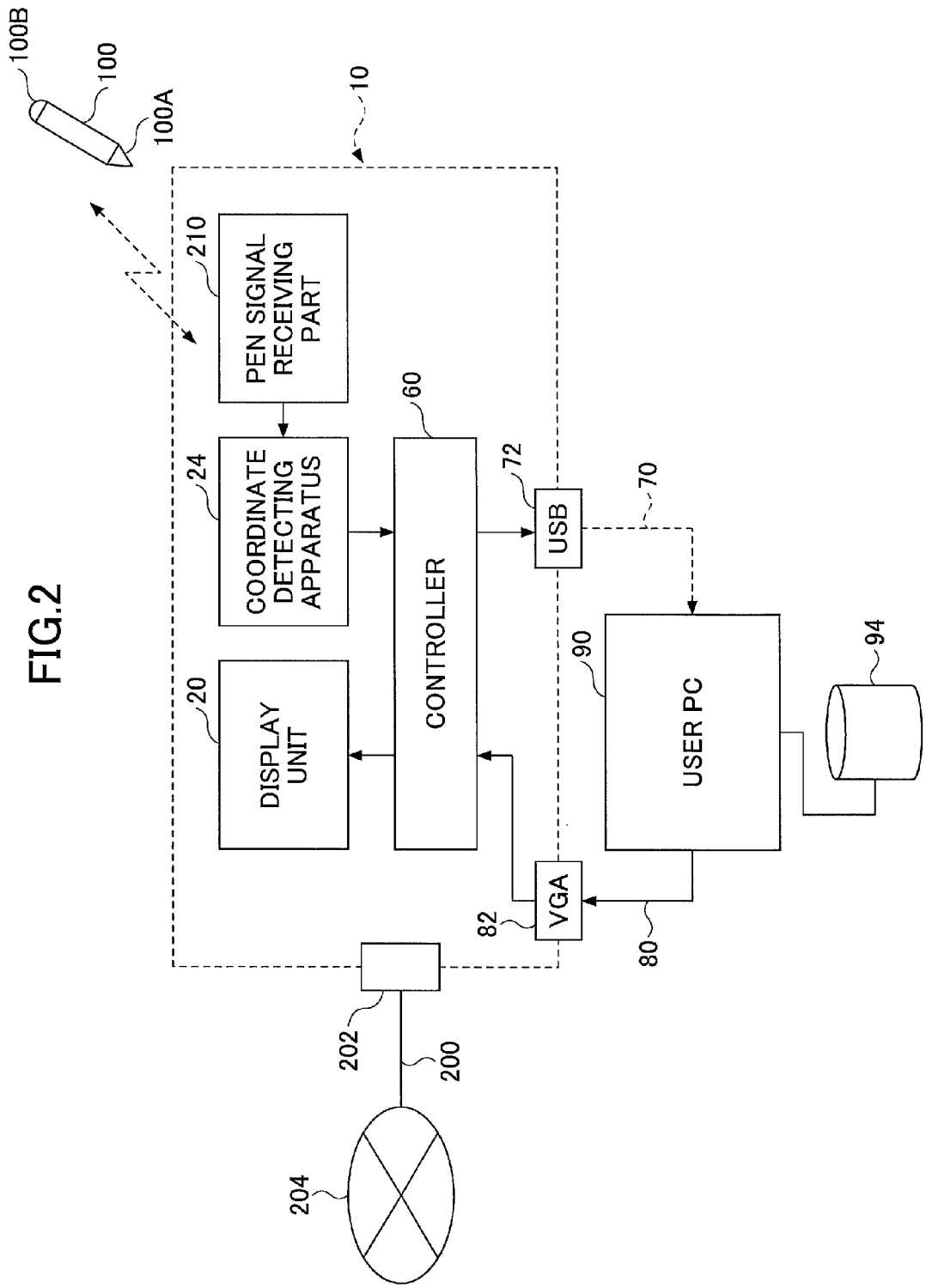
FIG. 2 schematically illustrates a portion of the electronic information board system.

FIG. 2 schematically illustrates a portion of the electronic information board system 10. As illustrated in FIG. 2, the display unit 20 is controlled by a controller 60 and displays an image taken from various screen operation parts 26 and a user personal computer (PC) 90, which are operated by an input.

Further, the controller 60 includes a universal serial bus (USB) socket, with which a universal serial bus (USB) cable 70 is connected, and a video graphic array (VGA) input socket 82 with which a video graphic array (VGA) cable 80 is connected.

The user personal computer (PC) 90 is connected with the controller 60 through the USB socket 72 and the VGA input socket 82. Further, the user PC 90 includes a storage 94 such as a magnetic disk device. The storage 94 stores various contents and a program such as application software for displaying the contents. The operator selects a desired content among the contents stored in the storage 94 and the selected content is displayed on a monitor 92.

Therefore, when image data displayed on the monitor 92 of the user PC 90 is transferred from the user PC 90 through the USE cable 70 and the VGA cable 80 to the controller 60, the controller 60 causes the image corresponding to the image data displayed on the user PC 90 to be displayed on the display unit 20.

Further, the controller 60 is connected with a communication line 200 such as an optical fiber and a network 204 such as the Internet or a local area network (LAN) through a network socket 202.

Further, as illustrated in FIG. 2, the electronic information board system 10 includes a pen signal receiving unit 210 for receiving a detection signal sent from the stylus pen 100. The pen signal receiving part 210 sends the detection signal to the coordinate detecting apparatus 24 when the pen signal receiving part 210 receives the detection signal sent from the stylus pen 100. With this, the coordinate detecting apparatus 24 detects that an input operation is performed by the stylus pen 100 by receiving the detection signal from the stylus pen 100 and outputs the detection signal to the controller 60.

(Control System of Electronic Information Board)

Figure 3:
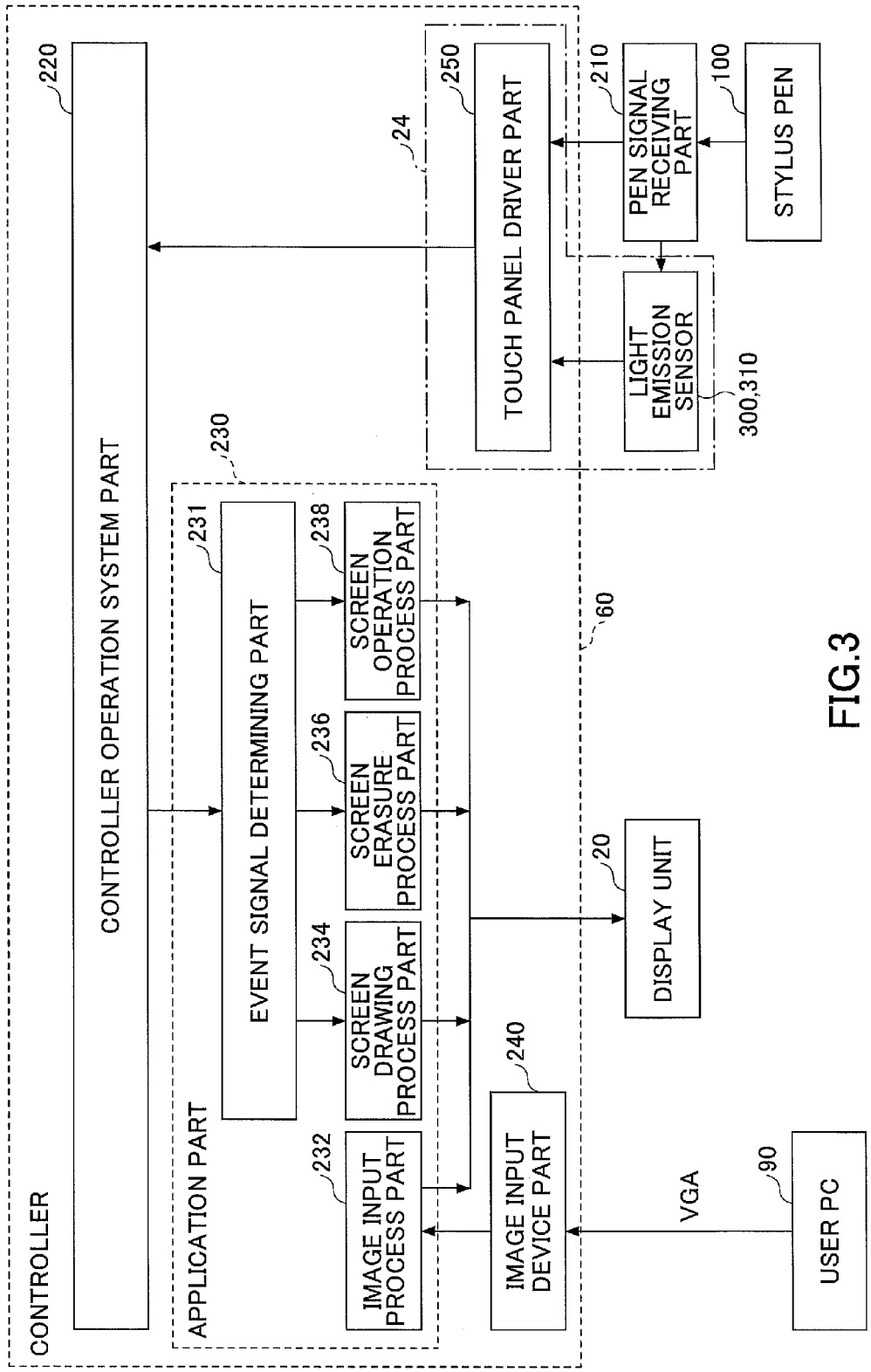
FIG. 3 is a block diagram illustrating a structure of a controller of the electronic information board.

FIG. 3 is a block diagram illustrating the structure of the controller of the electronic information board system 10. Referring to FIG. 3, the controller 60 of the electronic information board system 10 includes a pen signal receiving unit 210, a controller operation system portion 220, an application part 230, an image input device part 240, and a touch panel driver part 250. Further, the application part 230 includes an event signal determining part 231, an image input processing part 232, an image drawing processing part 234, a screen erasure process part 236, and a screen operation process part 238.

The controller operation system part 220 is a main control unit for managing and executing a control process performed by the controller 60.

The application part 230 performs a control process of generating an entire image to be displayed on the display unit 20, a control process of causing the image to be displayed on the user PC screen 28, and a control process of displaying a transcribed graphic, a transcribed character, or the like when a transcription detection signal is detected from the stylus pen 100.

The event signal determining part 231 monitors an event signal input from the controller operation system part 220, and performs a control process corresponding to the input event signal.

The image input process part 232 performs a control process for displaying an image input from the user PC 90 on the display unit 20.

The image drawing process part 234 generates a handwritten graphic based on the data at coordinate positions input from the coordinate detecting apparatus 24 through the event signal determining part 231, superposes the handwritten graphic on the image already displayed, and displays the image having the superposed handwritten graphic on the display unit 20.

The image erasure process part 236 generates a graphic using a background color of the image which is currently displayed based on the information at a coordinate position input from the coordinate detecting apparatus 24 through the event signal determining part 231, superposes the graphic generated using the background color on the image already displayed, and displays the image having the superposed graphic on the display unit 20. With this, the graphic of the background color is superposed on the handwritten graphic displayed on the display unit 20 to seemingly erase the handwritten graphic from the display unit 20.

The screen operation process part 238 converts the information (a signal) of the coordinate position input from the coordinate detecting apparatus 24 to a pointing device signal such as a mouse event and performs a process by turning on or off the screen operation parts 26 displayed through the display glass 22 of the display unit 20. Further, the screen operation process part 238 transfers the information of the coordinate position, at which the stylus pen 100 touches and which is detected by the light emission sensors 300 and 310 of the coordinate detecting apparatus 24, as a mouse down event together with the coordinate value of the coordinate position to the controller operation system part 220. Further, in a case where the stylus pen 100 is moved while the stylus pen 100 touches the protection glass 22 of the coordinate detecting apparatus 24, this movement is transferred as a mouse up event together with the coordinate value of the coordinate position to the controller operation system part 220.

The touch panel driver part 250 converts the coordinate position signal, the transcription detecting signal, and the erasure detecting signal, which are input from the stylus pen 100 and the coordinate detecting apparatus 24, to a predetermined event signal and transfers the converted signal to the controller operation system part 220. Further, the touch panel driver part 250 transfers the coordinate position signal and any one of the transcription detection signal and the erasure detection signal to the controller operation system part 220 when the transcription detection signal or the erasure detection signal is received by the pen signal receiving part 210.

(Method of Detecting Coordinate)

Figure 4:
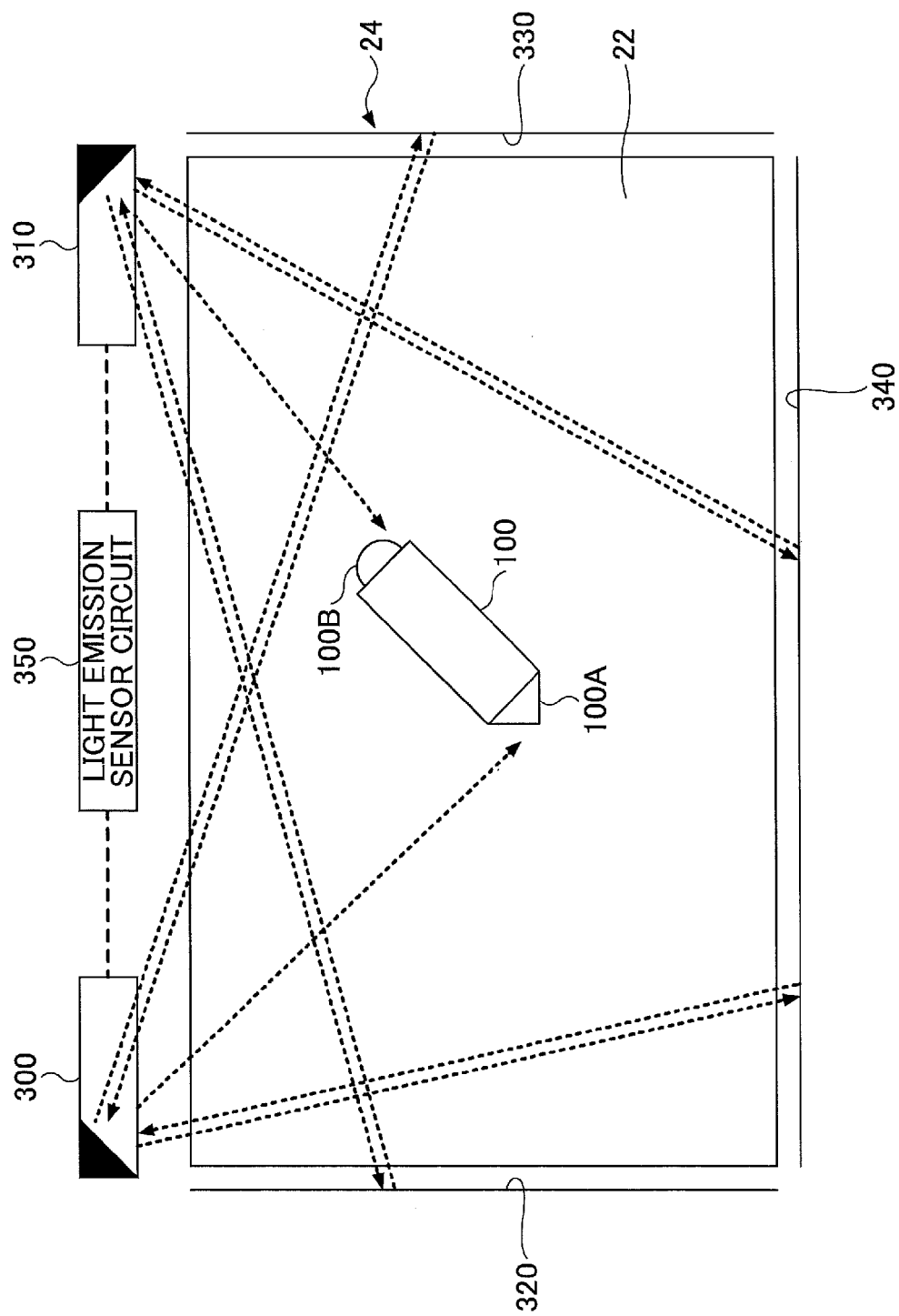
FIG. 4 illustrates the structure of the coordinate detecting apparatus.

FIG. 4 illustrates the structure of the coordinate detecting apparatus. As illustrated in FIG. 4, the coordinate detecting apparatus 24 includes a pair of light emission sensors 300 and 310 in right and left corners on an upper side of the peripheral portion of the protection glass 22. On right and left sides and a lower side of the peripheral portion of the protection glass, retroreflection plates 320, 330, and 340 are arranged. The retroreflection plates 320, 330, and 340 are provided to be arranged along edges of the protection glass 22 on right and left sides and the lower side. The widths of the retroreflection plates 320, 330, and 340 is 7 mm to 10 mm in the direction vertical to the surface of the protection glass 22. Therefore, if there is an obstacle such as the stylus pen 100 or a finger between the light emission sensors 300 and 310 and the retroreflection plates 320, 330, and 340, a reflected light reflected by the retroreflection plates 320, 330, and 340 at the coordinate position where the obstacle exists cannot be received by the light emission sensors 300 and 310.

The light emission sensor 300 arranged at the upper left corner emits infrared rays along a plane parallel to the protection glass 22. The directions of emitting the infrared rays are entirely toward the reflection plate 330 on the right side and the reflection plate 340 on the lower side in perpendicular to the surfaces of the reflection plate 330 and the reflection plate 340. The light emission sensor 310 arranged at the upper right corner emits infrared rays along a plane parallel to the protection glass 22. The directions of emitting the infrared rays are entirely toward the reflection plate 320 on the right side and the reflection plate 340 on the lower side in perpendicular to the surfaces of the reflection plate 320 and the reflection plate 340.

In a case where nothing touches the protection glass 22, the infrared rays emitted from the light emission sensors 300 and 310 are reflected by the reflection plates 320, 330, and 340, and the reflected light is received by the light emission sensor 300 and 310.

Here, in a case where the penpoint movable portion 120 or the pen tail movable portion 130 touches the protection glass 22, the infrared rays emitted from the light emission sensors 300 and 310 are interrupted at the position where the penpoint movable portion 120 or the pen tail movable portion 130 touches the protection glass 22. Therefore, a light emission sensor circuit 350 detects the angle of a gradient of a position where the infrared rays are interrupted relative to a horizontal direction based on the detection signals from the light emission sensors 300 and 310, and calculates and converts to the coordinate position on an X-Y coordinate using the formula of triangular survey. A signal of the coordinate position obtained by the light emission sensor circuit 350 is transferred through the controller operation system part 220 to the screen drawing process part 234, the screen erasure process part 236, and the screen operation process part 238.

In the stylus pen 100, a light emitting element may be built in the penpoint movable portion 120 and the pen tail movable portion 130. In a case where the light emitting element is provided in the penpoint of the pen tail of the stylus pen 100, the emission of the infrared rays becomes unnecessary. The coordinate of the touch position can be detected when the light emission sensors 300 and 310 receive a light (the infrared rays) emitted from the touch position.

(Principle of Coordinate Detection in an Optical Touch Panel)

Described next is the principle of the coordinate detecting apparatus 24 of the optical touch panel, to which the embodiment of the present invention is applicable. The principle of the coordinate detection is an example related to the coordinate detecting apparatus including the optical touch panel. The embodiment of the present invention is not limited to this method and can be applied to all optical coordinate detecting apparatuses.

Figure 5:
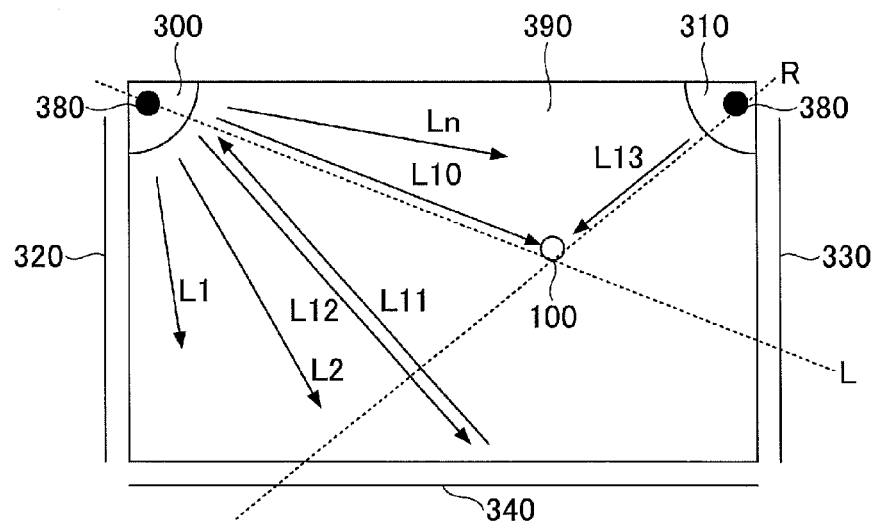
FIG. 5 schematically illustrates a principle of detecting the coordinate of an optical touch panel to which the present invention is applied.

FIG. 5 schematically illustrates the principle of detecting the coordinate of the optical touch panel, to which the embodiment of the present invention is applied. As illustrated in FIG. 5, the touch panel area 390 has a contour shape of a rectangle and is formed on the surface of the protection glass 22 of the display unit 20, which electronically displays an image. Described next is a case where the stylus pen 100 is made of an optically opaque material and this stylus pen touches the touch panel area 390. At this time, the coordinate detecting apparatus 24 detects the coordinate of the touch position where the stylus pen 100 touches the touch panel area 390.

The pair of light emission sensors 300 and 310 are provided on both upper corners of the touch panel area 390.

The Light emission sensors 300 and 310 emit a bundle of probe lights L1, L2, L3, . . . , Ln, which are light beams emitted toward the touch panel area 390. Specifically, this bundle of the probe lights L1, L2, L3, . . . , Ln is a fan like light wave travelling along a surface parallel to the surface of the touch panel area 390 extending from the secondary light sources 380.

The retroreflection plates 320, 330, and 340 are provided in the periphery of the touch panel area 390 such that retroreflection surfaces surround three side surfaces, namely right, left, and lower side surfaces, of the touch panel area 390.

The retroreflection plates 320, 330, and 340 are members having a property of reflecting an incident light in the same direction regardless of an incident angle. Referring to FIG. 5, L12 as one of the lights in the light wave emitted from, for example, the light emission sensors 300 and 310 is described. The light L12 is reflected by the retroreflection plates 320, 330, and 340, and travels the same light path again as the reflected light L11 toward the light emission sensors 300 and 310. A light receiving unit described below is installed in each of the light emission sensors 300 and 310. The light receiving unit can determine whether this retroreflection light returns to the light emission sensors 300 and 310 with respect to each of the probe lights L1 to Ln.

Described next is a case where the stylus pen 100 touches an arbitrary position on the touch panel area 390 by the user. At this time, the probe light L10 emitted from the light emission sensor 300 is interrupted at the touch position of the stylus pen 100 and cannot reach the retroreflection plates 320, 330, and 340. Therefore, the retroreflection light of the probe light L10 does not reach the light emission sensor 300. Therefore, when the light emission sensor 300 detects an event that the retroreflection light corresponding to the probe light L10 is not received, it is possible to detect that the stylus pen 100 touches an extended line (a straight line L) of the probe light L10. In a manner similar thereto, the probe light is emitted from the light emission sensor 310 installed on the upper right end of FIG. 5. When the light emission sensor 310 detects an event that the retroreflection light corresponding to the probe light L13 is not received, it is possible to detect that the stylus pen 100 touches an extended line (a straight line R) of the probe light L13. If it is possible to determine the straight lines L and R, the coordinate at the intersection between the straight lines L and R can be calculated by an operation to obtain the coordinate where the stylus pen 100 is inserted and touches.

Figure 6:
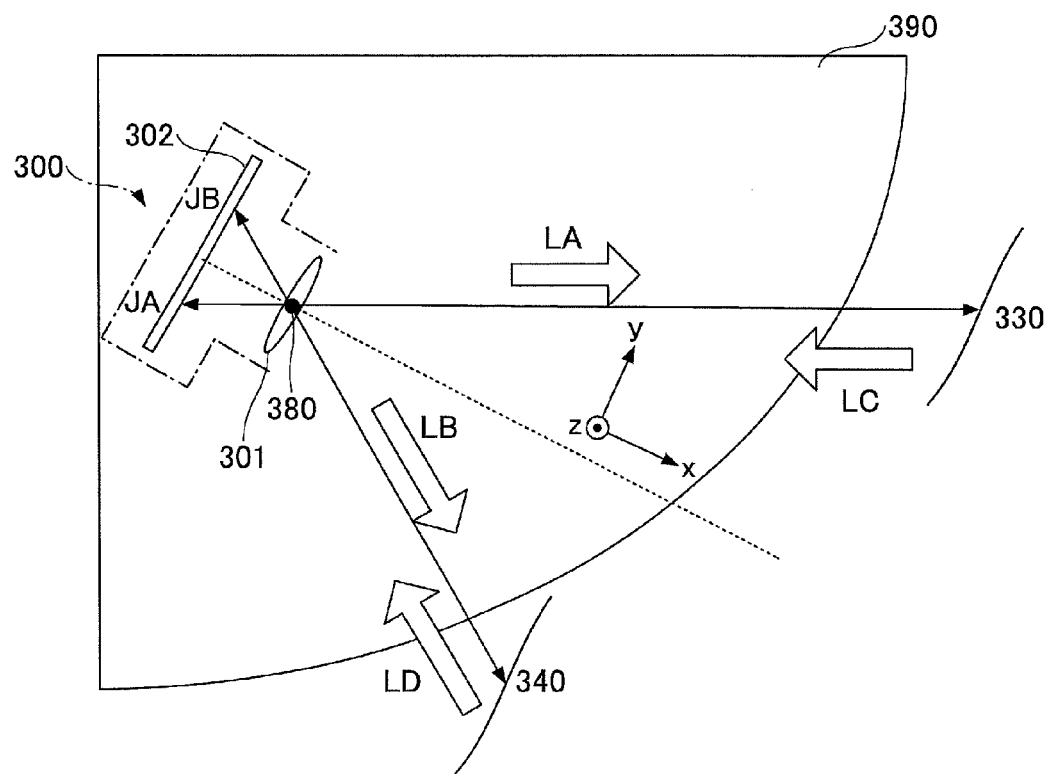
FIG. 6 is a front view of a light emission sensor viewed from a front side of a display unit.

Next, described is a method of detecting which probe light is interrupted among the probe lights L1 to Ln using the light transmission sensor 300. The summary of an internal structure of the light emission sensor 300 is illustrated in FIG. 6. FIG. 6 is a front view of the light emission sensor 300 viewed from a front side of the display unit 20.

For convenience of explanation, a two-dimensional plane parallel to the surface (a touch panel face) of the touch panel area 39 is used for the explanation. The light emission sensor 300 includes the secondary light source 308, a condensing lens 301, and a light receiving element 302. The secondary light source 380 emits the probe lights L1 to Ln in a fan-like shape from the condensing lens 301 to the touch panel area 390. The light in the fan-like shape emitted from the secondary light source 30 is a group of beams travelling in directions of an arrow LA, an arrow LB, and another direction.

The probe light travelling in a light traveling direction LA is reflected by the retroreflection plate 330, returns as the reflected light in a light traveling direction LC, passes through the condensing lens 301, and reaches a position JA on the light receiving element 302. The probe light travelling in a light traveling direction LB is reflected by the retroreflection plate 340, returns as the reflected light in a light traveling direction LD, passes through the condensing lens 301, and reaches a position JB on the light receiving element 302.

As described, the light which is emitted from the secondary light source 380 to the touch panel area 390, is reflected by the retroreflection plates 330 and 340, and returns through the same path to reach the different positions JA and JB of the light receiving element 302 by a function of the condensing lens 301. Therefore, when the stylus pen 100 touches a certain position of the touch panel area 390 to interrupt the probe light, the light does not reach one point on the light receiving element 302 corresponding to the probe light. Therefore, by checking the distribution of the light intensity on the light receiving element 302, it is possible to know which probe light is interrupted.

Figure 7:
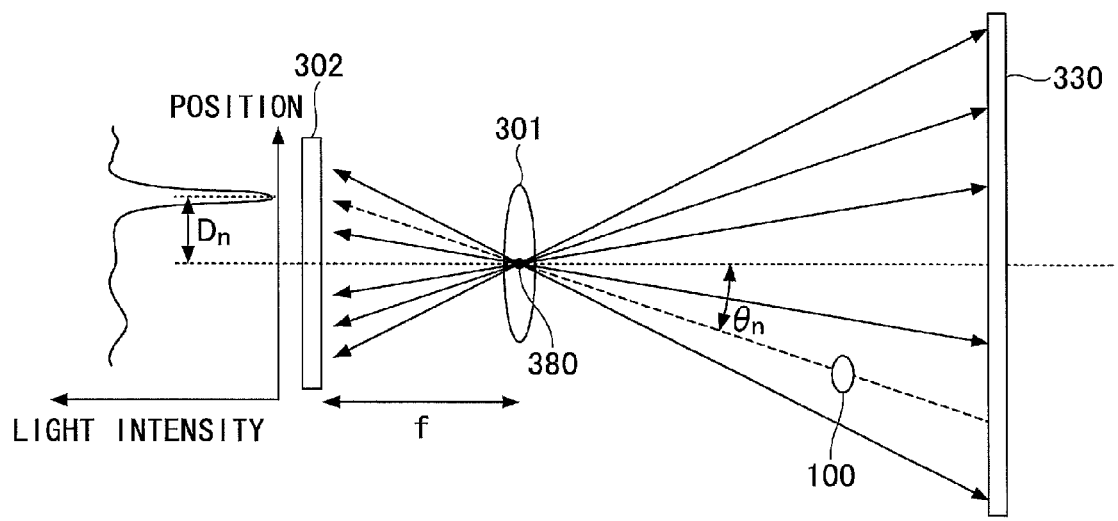
FIG. 7 schematically illustrates an example of a distribution of the light intensity of a light being incident on the light receiving element.

FIG. 7 schematically illustrates an example of a distribution of the light intensity of a light being incident on the light receiving element. Referring to FIG. 7, the light receiving element 302 is installed on a focal plane of the condensing lens 301. As illustrated in FIG. 7, the probe light emitted toward the forward side (in the right direction of FIG. 7) of the lens from the secondary light source 380 is reflected by the retroreflection plate 330 and returns on the same light path. Therefore, the reflected light converges at the position of the secondary light source 380. The center of the condensing lens 301 is installed so as to be in the same position as the position of the secondary light source. The retroreflection light reflected on the retroreflection plate 330 and returning to the condensing lens 301 passes through the center of the condensing lens 301 and further travels along a symmetric light path on the backward side of the condensing lens 301.

Described next is the distribution of the light intensity on the light receiving element 302 on which the retroreflection light is incident at this time. If the stylus pen 100 does not touch the touch panel area 390, the distribution of the light intensity on the light receiving element 301 is substantially constant. However, as illustrated in FIG. 7, in a case where the stylus pen 100 touches the touch panel area 390, the probe light passing through the touched position is interrupted. Therefore, there occurs an area (a scotoma) where the light intensity is weak at the position Dn on the light receiving element 301. This position Dn corresponds to an output and incident angle θn of the interrupted probe light. By detecting the position Dn, the output and incident angle θn can be known. Said differently, the output and incident angle θn can be expressed as a function of Dn such that:

$$\theta n = \arctan(Dn/f) \quad \text{[Formula 1]}$$

Here, the output and incident angle θn and the position Dn on the upper left light emission sensor 300 of FIG. 5 is replaced by θnL and DnL, respectively.

Figure 8:
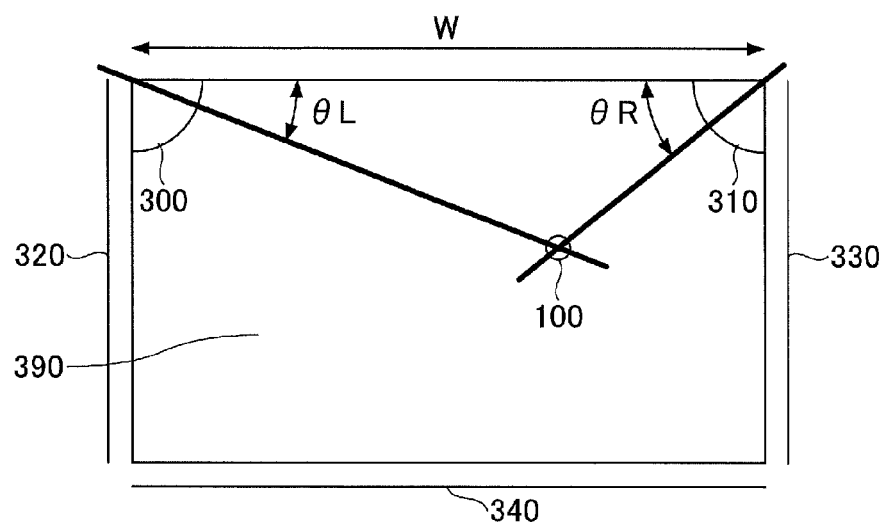
FIG. 8 illustrates a positional relationship between a touch position of a stylus pen and the light emission sensor.

Referring to FIG. 8, an angle θL formed by the touch position of the stylus pen 100 can be expressed as a function of DnL obtained by Formula 1 using a transformation g of geometrical relative positions of the light emission sensor 300 and the touch panel area 390, as follows:

$$\theta L = g(\theta nL), \quad \text{[Formula 2]}$$

where $\theta nL = \arctan(DnL/f)$

In the light emission sensor 310 on the upper right corner, the explanation similar to the above is applicable by replacing the suffix of "L" to the suffix of "R" and using a transformation h of geometrical relative positions of the right light emission sensor 310 and the touch panel area 390, as follows:

$$\theta L = h(\theta nR), \quad \text{[Formula 3]}$$

where $\theta nR = \arctan(DnR/f)$

FIG. 8 illustrates the positional relationship between the touch position of the stylus pen 100 and the light emission sensors 300 and 310. As illustrated in FIG. 8, a distance between positions of installing the light emission sensors 300 and 310 on the touch panel area 390 is referred to as "w". If the angles of gradient between the abscissa axis and linear lines connecting the touch position to the light emission sensors 300 and 310 are designated by θL and θR, respectively, the coordinate (x,y) of the touch position indicated by the stylus pen 100 on the touch panel area 390 is obtained by the following Formula 4 and Formula 5.

$$x = w \tan \theta R / (\tan \theta L + \tan \theta R) \quad \text{[Formula 4]}$$

$$y = w \tan \theta L \cdot \tan \theta R / (\tan \theta_L + \tan \theta R) \quad \text{[Formula 5]}$$

As such, the coordinate (x,y) can be expressed as a function of DnL and DnR. Said differently, the positions DnL and DnR of the scotoma on the light receiving element 302 of the right and left light emission sensors 300 and 310 are detected, and the geometrical arrangement of the light emission sensors 300 and 310 are considered to detect the coordinate of the touch position indicated by the stylus pen 100.

(Structure of Coordinate Detecting Apparatus)

Figure 9:
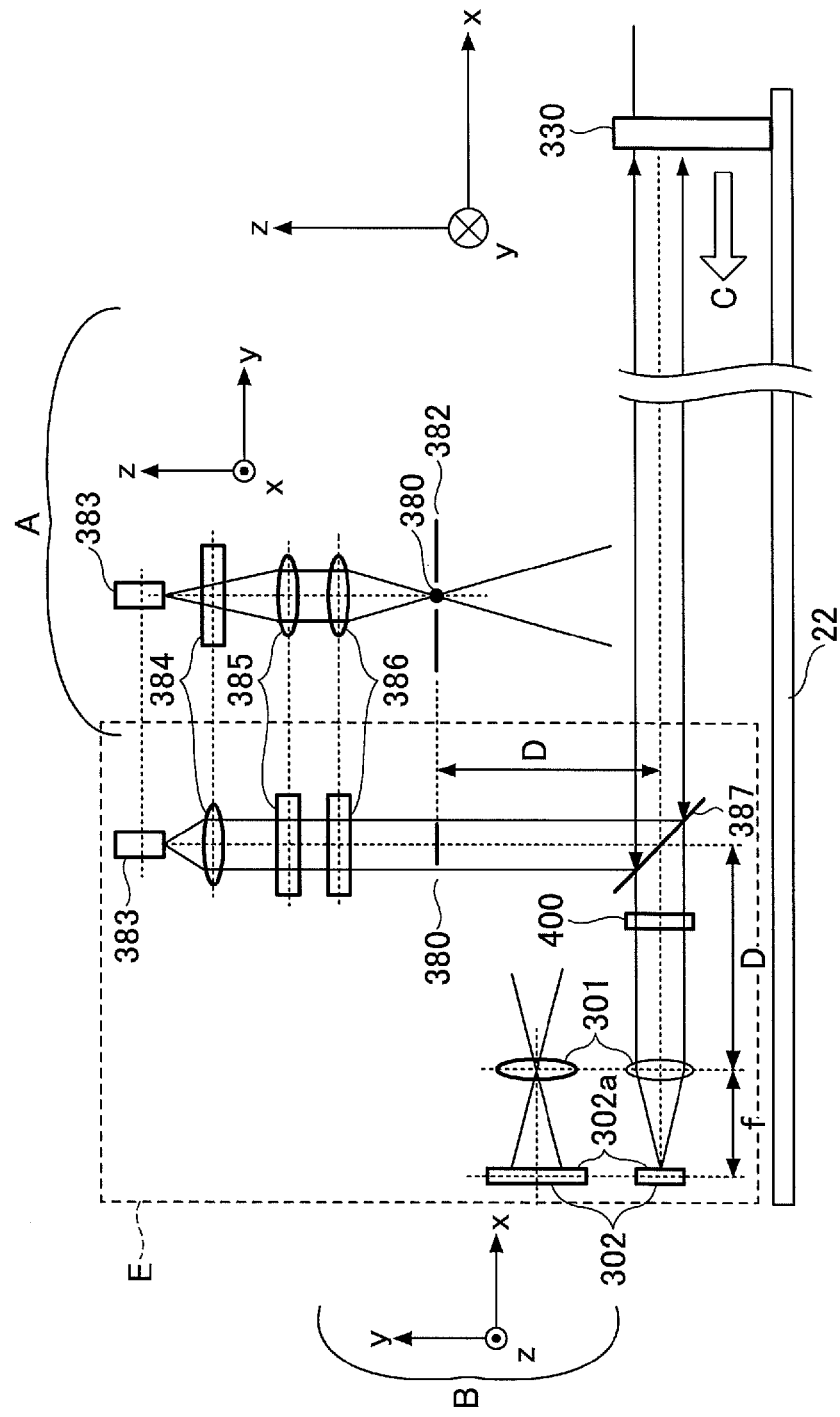
FIG. 9 illustrates the structure of the coordinate detecting apparatus of an embodiment.

FIG. 9 illustrates an optical system of the coordinate detecting apparatus of an embodiment. Referring to FIG. 9, for convenience of explanation, an optical system A is illustrated from the viewing direction of the x direction, and an optical system B is illustrated from the viewing direction of the z direction. The protection glass 22 forming the display surface is illustrated from the viewing direction of the y direction.

Here, the light emitting unit of each of the light emission sensors 300 and 310 is described. A light source 383 forming the light emitting unit of each of the light emission sensors 300 and 310 is a light emitting element such as a laser diode or a pinpoint LED which can reduce a spot size of the light to a certain extent.

Further, the light emitted in a direction z vertical to the display surface (the surface of the protection glass 22) from the light source 383 is changed to a parallel light that has the width only in the x direction by a cylindrical lens 384. When this parallel light is reflected by a half mirror 387 to travel in the x and y directions, the width of the parallel light is in a direction z vertical to the display surface (the surface of the protection glass 22). The parallel light from the cylindrical lens 384 is converged in the y direction by two cylindrical lenses 385 and 386 that has curvatures in a direction y perpendicular to the direction x of the curvature of the cylindrical lens 384. The optical system A illustrates the cylindrical lenses 384, 385, and 386 and a state of converging the light viewed along the x direction.

By the function of the group of the cylindrical lenses, an area where the parallel light converges in a linear shape is formed on the backward side (an output side) of the cylindrical lens 386. A long and thin slit 382 which is narrow in the y direction and long in the x direction is provided in the backward side (the output side) of the cylindrical lens 386. Said differently, the secondary light source 380 in the linear shape is formed at the position of the slit. The light emitted from the secondary light source 380 is reflected by the half mirror 387 and travels along the display surface (the surface of the protection glass). The light from the half mirror 387 in the horizontal direction does not spread in the vertical direction z vertical to the display surface (the surface of the protection glass 22) and travels along the display surface. At this time, this light is maintained to be the parallel light and spreads in the directions x and y parallel to the display surface (the surface of the protection glass 22) like a fan from the secondary light source 380 as a center.

As described, the light travelling along the display surface (the surface of the protection glass 22) is reflected by the retroreflection plate 330 provided in the periphery of the display and returns in the direction (an arrow C) toward the half mirror 387 through substantially the same light path. Then, the light that penetrates the half mirror 387 travels in parallel with the display surface (the surface of the protection glass 22), passes through the lens 301, and is incident on the light receiving element 302.

A part E surrounded by the broken line in FIG. 9 is a main body of each of the light emission sensors 300 and 310, in which the light emitting element of the coordinate detecting apparatus 24 is accommodated. The main body E of each of the light emission sensors 300 and 310 has a structure of including an emitted light path and a received light path. In the emitted light path, the light from the light source 383 is reflected by the half mirror 387 and the reflected light travels to the retroreflection plate 330. In the received light path, the light from the retroreflection plate 330 is received by the light receiving element 302. In the main body E, a light receiving opening (a light receiving area) is provided before the reflected light from the retroreflection plate 330 is received by the light receiving element 302. In the light receiving opening, a condensing lens 301 and a light polarizer (a polarization unit) 400 which limits an oscillation direction of the light to the light receiving element 302 in a direction where only a real image is obtained by causing a polarization component to penetrate or blocking the polarization component are provided.

In the light receiving area of the main body E of each of the light emission sensors 300 and 310, the light polarizer 400 is interposed between the half mirror 387 and the condensing lens 301. The light polarizer 400 blocks an S-polarization component (an S-wave) which oscillates in the z direction and causes a P-polarization component (a P-wave) which oscillates in the y direction to penetrate therethrough. The light polarizer 400 is shaped like a disc having a dimension corresponding to the condensing lens 301 and is provided so as to be rotatable around a light axis. Therefore, the light polarizer 400 can be adjusted so as to block the S-polarization component (the S-wave) and cause the P-polarization component (the P-wave) to penetrate the light polarizer 400.

(Function of Light Polarizer 400)

FIG. 10 schematically illustrates an exemplary structure including a light receiving element, a light receiving lens, a retroreflection plate, and a display surface. FIG. 11 schematically illustrates a structure where the light polarizer is arranged in front of the light receiving lens.

Referring to FIG. 10, a real image light path KA and a virtual image light path KB reflected on a surface 22a of the protection glass 22 are generated toward the light receiving element 302.

Because the real image light path KA and the virtual image light path KB are simultaneously incident on the light receiving element 302 from the retroreflection plate 330 to the light receiving element 302, a real image M and a virtual image N are formed on the light receiving element 302. Said differently, because the retroreflection component caused by the real image light path KA does not occupy 100% of the reflected light from the retroreflection plate 330, the retroreflection component caused by the virtual image light path KB is inevitably generated. As described, the real image M and the virtual image N are formed on a light receiving surface 302a of the light receiving element 302.

As illustrated in FIG. 11, within the first embodiment, the light polarizer 400 is provided on the forward side of the condensing lens 301 (on the side of the retroreflection plate 330). Therefore, the S-polarization component included in the virtual image light path KB is absorbed to thereby cause only the P-polarization component to penetrate the light polarizer 400. By arranging the light polarizer 400 on the forward side of the condensing lens 301, the virtual image light path KB is prevented from reaching the light receiving surface of the light receiving element 302, namely the P-polarization component (the P-wave) forming the real image M is caused to penetrate and the S-polarization component (the S-wave) forming the virtual image N is blocked.

The light polarizer 400 has a property of causing only a part of the light reflected from the retroreflection plate 330 to penetrate the light polarizer 400. Here, an electric field vector of this part of the light oscillates in only a predetermined direction on a face of the light polarizer 400 where the above reflected light is incident. Thus, the light polarizer 400 is arranged such that the P-polarization component (the P-wave) where the electric field vector VA oscillates only on the plane of FIG. 11 is caused to penetrate and the S-polarization component (the S-wave) where the electric field vector VB oscillates in a direction perpendicular to the plane of FIG. 11 is blocked.

The virtual image light path B is formed because (a) the refractive index of the protection glass 22 is greater than that of air, and (b) the incident angle of the virtual image light path KB relative to the surface of the protection glass 22 is very large. Therefore, the ratio of the S-polarization component (the S-wave) in the incident light to the light receiving element is high. A substantial part of the reflected light which is reflected by the protection glass 22 and generates the S-polarization component of forming the virtual image N is blocked by the light polarizer 400. Further, because the light which travels through the real image light path KA and forms the real image M penetrates the light polarizer 400, only the real image M is resultantly formed on the light receiving surface 302a of the light receiving element 302.

Instead of using the light polarizer 400, a polarization film or a polarization membrane each having a function similar to that of the light polarizer 400 may be provided to coat the forward surface of the condensing lens 301.

(Reason of Erroneous Detection Caused by Formation of Virtual Image)

Figure 12:
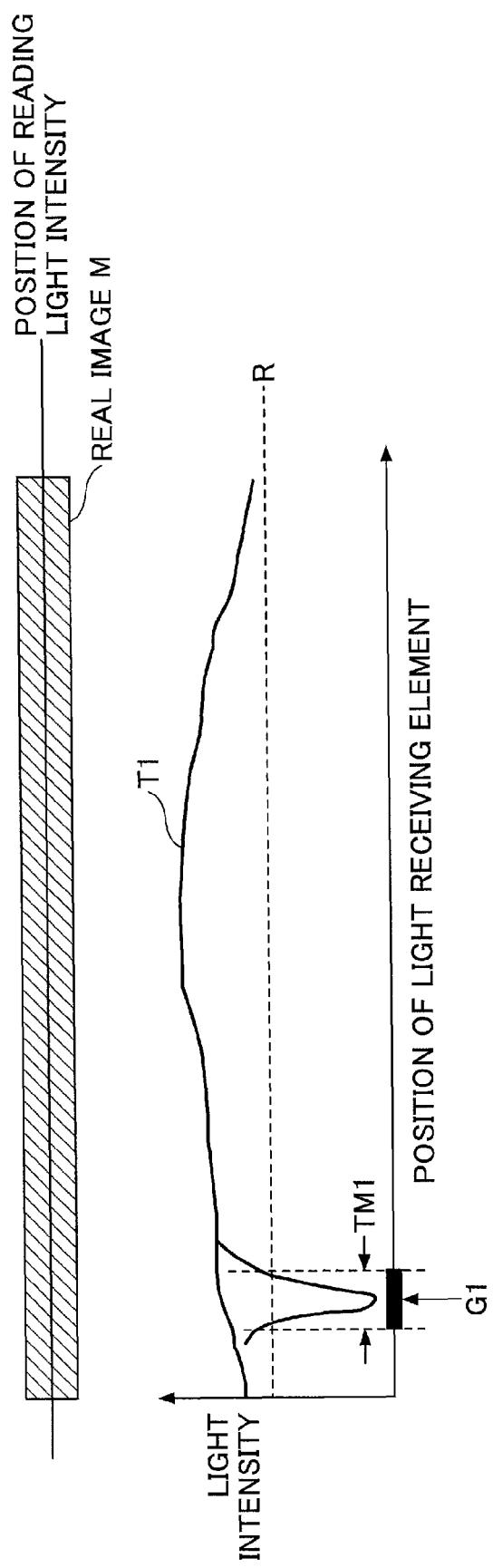
FIG. 12 schematically illustrates a distribution of a light intensity in a case where there is no virtual image.
Figure 13:
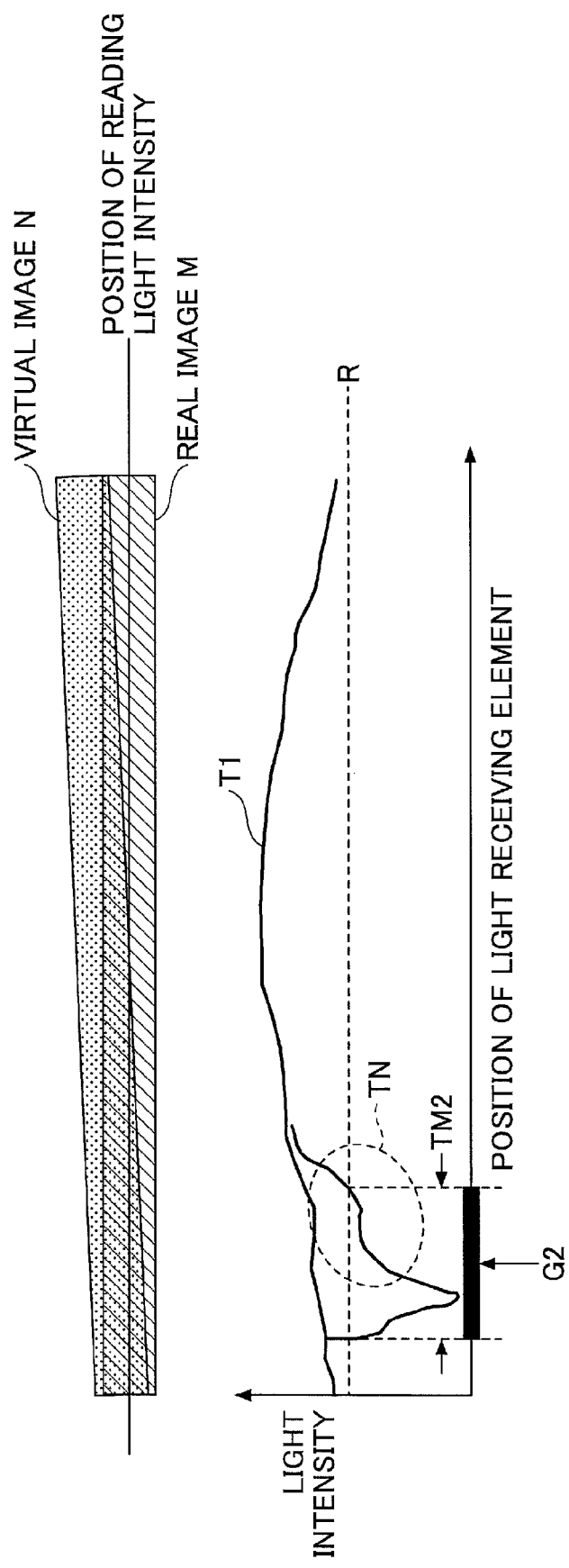
FIG. 13 schematically illustrates a changed pattern of a light intensity in a case where there is a virtual image at a read position.

Described next is the reason why the touch position is erroneously detected when a virtual image is formed on the light receiving surface 302a of the light receiving element 302 and the stylus pen 100 touches the surface 22a of the protection glass 22. FIG. 12 schematically illustrates a distribution of a light intensity in a case where there is no virtual image. FIG. 13 schematically illustrates a changed pattern of the light intensity in a case where there is a virtual image at a read position.

Referring to FIG. 12, in a read light intensity distribution T1 when the stylus pen 100 does not touch the light receiving surface 302a of the light receiving element 302, the light intensity is higher than a threshold value R through positions of reading the light intensity on the real image formed on the light receiving surface 302a of the light receiving element 302.

The light intensity distribution T1 when the stylus pen 100 does not touch the light receiving surface 302a of the light receiving element 302 is compared with the light intensity distribution T1 when the stylus pen 100 touches the light receiving surface 302a of the light receiving element 302. At first, a dip position TM1 of the light intensity caused by the touch of the stylus pen 100 is detected to thereby detect a coordinate position where the stylus pen 100 touches. Within the first embodiment, the coordinate position G1 is determined as a center position of the dip position TM1 where the light intensity becomes equal to or less than the threshold value R.

The light intensity in a case where the stylus pen 100 is not detected is as illustrated in FIG. 12. However, in the case where the stylus pen 100 touches the surface 22a of the protection glass 22, the surface 22a of the protection glass 22 slightly shows flexural deformation by a pressure caused by the stylus pen 100. As a result, as illustrated in FIG. 13, the virtual image N formed by the light reflected on the surface 22a of the protection glass 22 on the light receiving surface 302a of the light receiving element 302 moves and may overlap the real image M.

In a static state, the virtual image N is arranged in parallel to the real image M. Then, if the flexural deformation occurs in the protection glass 22 by the pressure of the stylus pen 100, the position of the virtual image N moves. Referring to FIG. 13, the virtual image N is moved to partly overlap the real image M at a lower part of the virtual image N by the flexural deformation of the protection glass 22. The flexural deformation of the protection glass 22 does not occur only at a point where the stylus pen 22 touches but occurs also in a vicinity of the touched point continuously. Therefore, the virtual image N is moved by a certain range corresponding to the vicinity of the touched point. FIG. 13 schematically illustrates the movement of the virtual image N caused by the flexural deformation of the protection glass 22.

As described, because the virtual image N moves and partly overlaps the real image M, not only the light intensity of the real image M at a position touched by the stylus pen 100 but also the light intensity in the vicinity of the touched position changes. Therefore, the change of the light intensity occurs as illustrated in FIG. 13.

Said differently, a dip TM of the light intensity caused by the touch of the stylus pen 100 on the surface 22a of the protection glass 22 includes the dip TM1 caused by the existence of the stylus pen 100 and a dip TN. When the dip TN caused by the virtual image N is detected, the light intensity distribution caused by the dip TM1 differs from that further caused by the dip TN.

Therefore, when the position where the stylus pen 100 touches the surface of the protection glass 22 by a threshold value process of selecting a range where the light intensity is equal to or less than the threshold value R, the central position of the dip position TM2 indicated by a bold line in FIG. 13 is detected as the coordinate position G2.

When both the real image M and the virtual image N are detected, the coordinate position G2 of the dip position TM2 becomes wider than the coordinate position G1 of the real image M because the dip TN caused by the virtual image N is added. Therefore, the detected coordinate position G2 is an erroneous position shifted rightward from the detected real image M. As a result, the coordinate position G2 is erroneously detected as the coordinate position of the real image M. Instead of detecting the coordinate position G1 of the real image M, the coordinate position G2 is detected by the existence of the virtual image N. Thus, the coordinate position cannot be accurately detected.

Within the first embodiment, because the light polarizer 400 is arranged on the forward side of the condensing lens 301 as described above, it is possible to prevent the virtual image N from being formed on the light receiving surface 302a of the light receiving element 302, and the coordinate position using only the real image is detected. Therefore, if the flexural deformation occurs on the surface 22a of the protection glass 22, the shape of the light intensity distribution obtained in the light receiving element 302 is not deformed to thereby enable the accurate touch position to be detected.

A thin glass which tends to cause flexural deformation by a touch pressure can be used as the protection glass 22 because the touch position can be accurately detected by avoiding the influence of the virtual image N even though the flexural deformation occurs on the surface 22a of the protection glass 22. By making the protection glass 22 as thin as possible, the elasticity for the touch pressure applied by the stylus pen 100 becomes high to improve a feeling of an transcribing operation. Further, by thinning the protection glass 22, a gap between the display element face of the display unit 20 and the surface 22a of the protection glass 22 can be made smaller. Therefore, a parallax caused by the thickness of the protection glass 22 can be substantially reduced. If the touch pressure in transcription is high in the electronic information board system, elastic deformation of the thinned protection glass 22 can provide a good transcription feel.

A distance between the penpoint and the display surface (the surface 22a of the protection glass 22) where handwriting is displayed can be reduced by reducing the parallax caused by the thickness of the protection glass 22. For example, when a pencil is used to write on a paper, the distance between the penpoint of the pencil and the paper is zero (the penpoint directly touches the paper). However, because the stylus pen 100 is used to transcribe on the surface 22a of the protection glass 22, there is a distance between the penpoint of the stylus pen 100 and the display element face beneath the surface 22a (the penpoint does not directly touch the display element face). By thinning the protection glass 22, the parallax or the like can be made similar to the case where the pencil is used to write on the paper. As a result, it is possible to substantially improve comfort of transcription using the stylus pen 100.

Within the first embodiment, the stylus pen 100 is used such that the penpoint is caused to touch the surface 22a of the protection glass 22 of the display unit 20 as the example. However, the embodiment is not limited thereto. For example, a stylus having a light emitting element, a stick-like indicating member, or a finger of an operator can be caused to touch the surface 22a of the protection glass 22.

Further, within the first embodiment, the pair of light emission sensors 300 and 310 are provided in the upper right and left corners on an upper side of the display unit 20. However, the embodiment is not limited thereto. For example, multiple light emitting elements such as a light-emitting diode and multiple light receiving elements such as a photo diode may be arranged in the peripheral portion of the display unit 20 so as to face in the x-direction or the y-direction.

Because it is possible to prevent the light emitted from the light emitting element from reflecting on the surface of the display so as to reach the light receiving element, the light intensity of the light reaching the light receiving element can be properly controlled. Therefore, a variation of the light intensity in the light receiving element caused by the deformation (the flexural deformation) of the surface of the display by the touch pressure can be prevented. As a result, even in a case where the touch pressure is high and the deformation occurs in the protection glass, the coordinate position of the touch position can be accurately detected.

Further, by preventing the erroneous detection of the touch position by the deformation of the surface of the display, the thickness of the protection glass forming the surface of the display can be thinned. As a result, because the gap between the surface of the protection glass and the display element face can be small, the parallax caused by the gap can be substantially reduced. With this, it is possible to provide a good transcription feel in transcribing using the electronic information board system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the coordinate detecting apparatus has been described in detail, it should be understood that various changes, substitutions, and alterations could be made thereto without departing from the spirit and scope of the invention.

This application is based upon and claims the benefit of priority of the prior Japanese Patent Application No. 2013-171159, filed on Aug. 21, 2013, the entire contents of which are incorporated herein by reference.

What is claimed is:
1. A coordinate detecting apparatus comprising:
    a light emitting element that is provided in a peripheral portion surrounding a surface of a display and emits a light to the surface of the display;
    a light receiving element that is provided in the peripheral portion surrounding the surface of the display and receives the light emitted from the light emitting element through a light receiving lens; and
    a polarization unit that blocks an S-polarization component and causes a P-polarization component to penetrate the polarization unit, the S-polarization component and the P-polarization component being included in the light received by a light receiving surface of the light receiving element, the S-polarization component oscillating in a vertical direction, the P-polarization component oscillating in a horizontal direction, the polarization unit being positioned before the light receiving lens along a direction of receiving the light so as to prevent a virtual image from reaching the light receiving surface of the light receiving element,
    wherein a coordinate of a touch position where an indicating unit touches the surface of the display is detected based on a light intensity distribution of the light received by the light receiving element.

2. The coordinate detecting apparatus according to claim 1,
    wherein the light emitting element and the light receiving element form a pair of light emission sensors that are respectively arranged in left and right corners on an upper side of the display,
    wherein the pair of light emission sensors receive the light reflected by a retroreflection member provided in the peripheral portion surrounding the surface of the display.

3. The coordinate detecting apparatus according to claim 2,
    wherein the polarization unit is provided in a main body of each of the light emission sensors.

4. An electronic information board system comprising:
    the coordinate detecting apparatus according to claim 1; and
    a display unit that displays a graphic at the coordinate position detected by the coordinate detecting apparatus.

5. The coordinate detecting apparatus according to claim 1,
    wherein a protection glass forms the surface of the display,
    wherein the polarization unit blocks the S-polarization component that is included in the light reflected on the surface of the protection glass and oscillates in a vertical direction and causes the P-polarization component that is included in the light reflected on the surface of the protection glass and oscillates in a horizontal direction to penetrate the polarization unit,
    wherein the coordinate of the touched position where the indicating unit touches a surface of the protection glass is detected based on the light intensity distribution of the light received by the light receiving element.

6. The coordinate detecting apparatus according to claim 1,
    wherein the light emitting element is provided at an end of the indicating unit that touches the surface of the display.

7. A method of detecting a coordinate of a touch position, the method comprising:
    emitting, by a light emitting element that is provided in a peripheral portion surrounding a surface of a display or provided in an end of an indicating unit, a light to the surface of the display;
    receiving, by a light receiving element that is provided in the peripheral portion surrounding the surface of the display, the light emitted from the light emitting element through a light receiving lens; and
    blocking, by a polarization unit, an S-polarization component and causing, by the polarization unit, a P-polarization component to penetrate the polarization unit, the S-polarization component and the P-polarization component being included in the light received by a light receiving surface of the light receiving element, the S-polarization component oscillating in a vertical direction the P-polarization component oscillating in a horizontal direction, the polarization unit being positioned before the light receiving lens along a direction of receiving the light so as to prevent a virtual image from reaching the light receiving surface of the light receiving element,
    detecting the coordinate of the touch position on the surface of the display based on a light intensity distribution of the light received by the light receiving element.

8. The method of detecting the coordinate of the touch position according to claim 7,
  wherein, in the emitting the light and the receiving the light, the emitting element and the light receiving element form a pair of light emission sensors that are respectively arranged in left and right corners on an upper side of the display,
  wherein, in the receiving the light, the pair of light emission sensors receive the light reflected by a retroreflection member provided in the peripheral portion surrounding the surface of the display.

* * * * *